United States Patent
Howell et al.

(10) Patent No.: US 10,581,817 B1
(45) Date of Patent: *Mar. 3, 2020

(54) DIGITAL SECURITY BUBBLE

(71) Applicant: Wickr Inc., San Francisco, CA (US)

(72) Inventors: Christopher Howell, Freehold, NJ (US); Robert Statica, Long Valley, NJ (US); Kara Lynn Coppa, Long Valley, NJ (US)

(73) Assignee: Wickr Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,242

(22) Filed: Feb. 26, 2018

Related U.S. Application Data (63) Continuation of application No. 15/496,187, filed on Apr. 25, 2017, now Pat. No. 10,038,677, which is a continuation of application No. 14/791,196, filed on Jul. 2, 2015, now Pat. No. 9,667,417, which is a continuation of application No. 14/592,832, filed on Jan. 8, 2015, now Pat. No. 9,584,316, which is a continuation of application No. 14/089,634, filed on Nov. 25, 2013, now Pat. No. 8,954,726, which is a continuation of application No. 13/942,554, filed on Jul. 15, 2013, now Pat. No. 8,625,805.

(60) Provisional application No. 61/672,099, filed on Jul. 16, 2012.

(51) Int. Cl.
*H04L 9/32* (2006.01)
*H04L 29/06* (2006.01)

(52) U.S. Cl.
CPC ........ *H04L 63/061* (2013.01); *H04L 63/0435* (2013.01); *H04L 63/0442* (2013.01); *H04L 63/0853* (2013.01)

(58) Field of Classification Search
CPC .... H04L 9/0822; H04L 63/0435; H04L 63/04
USPC ........................................................ 713/171
See application file for complete search history.

(56) References Cited

U.S. PATENT DOCUMENTS

| | | | |
|---|---|---|---|
| 5,850,443 A | 12/1998 | Oorschot et al. | |
| 6,009,173 A | 12/1999 | Sumner | |
| 6,266,420 B1 | 7/2001 | Langford et al. | |
| 6,314,190 B1 | 11/2001 | Zimmermann | |
| 6,378,070 B1 * | 4/2002 | Chan .................. | G06F 21/608 380/255 |
| 6,912,656 B1 | 6/2005 | Perlman et al. | |
| 7,139,399 B1 | 11/2006 | Zimmermann | |

(Continued)

FOREIGN PATENT DOCUMENTS

WO    2011101784 A1    8/2011

OTHER PUBLICATIONS

Apple. iOS Security. May 2012.

(Continued)

*Primary Examiner* — Mohammad W Reza
(74) *Attorney, Agent, or Firm* — Banner & Witcoff, Ltd.

(57) ABSTRACT

A digital security bubble encapsulation is disclosed. A public key and a device identifier of at least one recipient is requested from a first server. A message containing one or more components is encrypted using a symmetric key. The symmetric key is encrypted with a public key received in response to the request. The encrypted message, the encrypted symmetric key, and the device identifier are encapsulated in a digital security bubble encapsulation. The digital security bubble encapsulation is transmitted to a second server.

19 Claims, 12 Drawing Sheets

(56) References Cited

U.S. PATENT DOCUMENTS

| | | | |
|---|---|---|---|
| 7,356,564 B2 | 4/2008 | Hartselle et al. |
| 7,383,439 B2 | 6/2008 | Price et al. |
| 7,640,427 B2 | 12/2009 | Callas et al. |
| 7,730,309 B2 | 6/2010 | Zimmermann |
| 7,802,099 B2 | 9/2010 | Mitchell et al. |
| 8,347,083 B1 | 1/2013 | Scudder |
| 8,364,764 B2 | 1/2013 | Hartselle et al. |
| 8,379,857 B1 | 2/2013 | Zheng |
| 8,392,699 B2 | 3/2013 | Jones et al. |
| 8,412,934 B2 | 4/2013 | Atley et al. |
| 8,433,901 B2 | 4/2013 | Atley et al. |
| 8,510,552 B2 | 8/2013 | Atley et al. |
| 8,527,769 B2 | 9/2013 | Kotla et al. |
| 8,560,843 B1 | 10/2013 | Moscaritolo et al. |
| 8,589,673 B2 | 11/2013 | Ackerly |
| 8,589,680 B2 | 11/2013 | Atley et al. |
| 8,649,515 B1 | 2/2014 | Zhao et al. |
| 8,677,136 B2 | 3/2014 | Brokenshire et al. |
| 8,705,565 B2 | 4/2014 | Kutt et al. |
| 8,713,311 B1 | 4/2014 | Roskind |
| 8,726,009 B1 | 5/2014 | Cook et al. |
| 8,756,419 B2 | 6/2014 | Atley et al. |
| 8,782,409 B2 | 7/2014 | Murphy et al. |
| 8,788,842 B2 | 7/2014 | Brouwer et al. |
| 8,788,899 B2 | 7/2014 | Hiie |
| 8,837,739 B1 | 9/2014 | Sexton et al. |
| 8,874,902 B2 | 10/2014 | Ackerly |
| 8,918,896 B2 | 12/2014 | Murphy et al. |
| 8,938,810 B2 | 1/2015 | Richardson et al. |
| 8,948,382 B2 | 2/2015 | Hassan et al. |
| 8,958,559 B2 | 2/2015 | Medina et al. |
| 8,996,861 B1 | 3/2015 | Cummings et al. |
| 9,059,840 B2 | 6/2015 | Connelly et al. |
| 9,071,597 B2 | 6/2015 | Lord et al. |
| 9,094,405 B2 | 7/2015 | Buck |
| 9,225,709 B2 | 12/2015 | Ackerly |
| 9,237,016 B2 | 1/2016 | Atley et al. |
| 9,264,406 B2 | 2/2016 | Kipnis et al. |
| 9,288,047 B2 | 3/2016 | Brouwer et al. |
| 9,326,135 B2 | 4/2016 | Rodrigues et al. |
| 9,602,277 B2 | 3/2017 | Marlow et al. |
| 2001/0044901 A1 | 11/2001 | Grawrock |
| 2003/0021416 A1 | 1/2003 | Brown et al. |
| 2004/0133520 A1 | 7/2004 | Callas et al. |
| 2004/0133775 A1 | 7/2004 | Callas et al. |
| 2004/0168055 A1 | 8/2004 | Lord et al. |
| 2004/0205248 A1 | 10/2004 | Little et al. |
| 2004/0210772 A1 | 10/2004 | Hooker et al. |
| 2006/0031670 A1 | 2/2006 | Price |
| 2007/0003065 A1 | 1/2007 | Schwartz et al. |
| 2007/0003066 A1 | 1/2007 | Schwartz et al. |
| 2007/0038715 A1 | 2/2007 | Collins et al. |
| 2007/0050624 A1 | 3/2007 | Lord et al. |
| 2007/0150521 A1 | 6/2007 | Vedula |
| 2007/0236476 A1 | 10/2007 | Suzuki |
| 2007/0269041 A1 | 11/2007 | Bhatnagar et al. |
| 2007/0283442 A1 | 12/2007 | Nakano et al. |
| 2008/0162935 A1* | 7/2008 | Ginzboorg ............ H04L 9/0822 713/170 |
| 2009/0006851 A1* | 1/2009 | Freeman ............ H04L 63/0442 713/170 |
| 2009/0052660 A1 | 2/2009 | Chen et al. |
| 2009/0265552 A1 | 10/2009 | Moshir et al. |
| 2010/0002882 A1 | 1/2010 | Rieger |
| 2010/0217984 A1 | 8/2010 | Hill |
| 2010/0223470 A1 | 9/2010 | Lord et al. |
| 2010/0275007 A1 | 10/2010 | Kutt et al. |
| 2011/0131406 A1 | 6/2011 | Jones et al. |
| 2011/0145564 A1 | 6/2011 | Moshir et al. |
| 2011/0148776 A1 | 6/2011 | Hautala |
| 2011/0202598 A1 | 8/2011 | Evans et al. |
| 2012/0102326 A1 | 4/2012 | Palekar |
| 2012/0179905 A1 | 7/2012 | Ackerly |
| 2012/0209924 A1 | 8/2012 | Evans et al. |
| 2012/0226369 A1 | 9/2012 | Mori |
| 2012/0311329 A1 | 12/2012 | Medina et al. |
| 2013/0034229 A1 | 2/2013 | Sauerwald et al. |
| 2013/0036302 A1 | 2/2013 | Lord et al. |
| 2013/0159436 A1 | 6/2013 | Hartselle et al. |
| 2013/0194301 A1 | 8/2013 | Robbins et al. |
| 2013/0198513 A1 | 8/2013 | Kim |
| 2013/0305049 A1 | 11/2013 | Krakowski |
| 2014/0052982 A1 | 2/2014 | Ackerly |
| 2014/0136842 A1 | 5/2014 | Kitze et al. |
| 2014/0304508 A1 | 10/2014 | Murphy et al. |
| 2015/0006884 A1 | 1/2015 | Ackerly |
| 2015/0082391 A1 | 3/2015 | Lerman et al. |
| 2015/0156177 A1 | 6/2015 | Murphy et al. |
| 2015/0215291 A1 | 7/2015 | Abdunabi et al. |
| 2015/0229612 A1 | 8/2015 | Hassan et al. |
| 2015/0264042 A1 | 9/2015 | Lord et al. |
| 2015/0264540 A1 | 9/2015 | Brooks et al. |
| 2015/0271653 A1 | 9/2015 | Brooks et al. |
| 2015/0326731 A1 | 11/2015 | Laasik et al. |
| 2015/0350247 A1 | 12/2015 | Adler et al. |
| 2015/0350895 A1 | 12/2015 | Brander et al. |
| 2015/0373021 A1 | 12/2015 | Tussy |
| 2016/0036791 A1 | 2/2016 | Sauerwald et al. |
| 2016/0127331 A1 | 5/2016 | Liu et al. |
| 2016/0164854 A1 | 6/2016 | Lerman et al. |
| 2016/0380937 A1 | 12/2016 | Murphy et al. |
| 2017/0012950 A1 | 1/2017 | Kim et al. |
| 2017/0118183 A1 | 4/2017 | Shin et al. |
| 2017/0279780 A1 | 9/2017 | Fielder |
| 2018/0083934 A1 | 3/2018 | Freeman et al. |

OTHER PUBLICATIONS

Author Unknown, "myENIGMA: Whitepaper" Qnective AG, 2013.
Author Unknown, "Threema Cryptography Whitepaper" Threema, Mar. 9, 2015.
B. Kaliski "PKCS #7: Cryptographic Message Syntax." Version 1.5. Mar. 1998, http://tools.ietf.org/html/rfc2315.
Callas et al. "OpenPGP Message Format." RFC 4880, Nov. 2007.
Moscaritolo et al. "Silent Circle Instant Messaging Protocol Protocol Specification." Silent Circle Engineering, Version 1.0. Dec. 5, 2012.
Ms. Smith "How to easily encrypt email with Virtru for free: Gmail, Hotmail, Outlook, Yahoo" Network World, Jan. 28, 2014.
Pomian & Corella LLC "Submission of Prior Art under 37 CFR 1.501 for U.S. Pat. No. 8,625,805" Apr. 18, 2014.
S. Kent. "Privacy Enhancement for Internet Electronic Mail: Part 2: Certificate: Certificate-Based Key Management" Feb. 1993, http://tools.ietf.org/html/rfc1422.
Toorani et al. "SSMS—A Secure SMS Messaging Protocol for the M-Payment Systems," Proceedings of the 13th IEEE Symposium on Computers and Communications, IEEE, Jul. 2008.

* cited by examiner

DIGITAL SECURITY BUBBLE

CROSS REFERENCE TO OTHER APPLICATIONS

This application is a continuation of co-pending U.S. patent application Ser. No. 15/496,187, entitled "Digital Security Bubble," filed on Apr. 25, 2015, which is a continuation of U.S. patent application Ser. No. 14/791,196, entitled "Digital Security Bubble" filed on Jul. 2, 2015 and issued as U.S. Pat. No. 9,729,315 on Aug. 8, 2017, which is a continuation of U.S. patent application Ser. No. 14/592,832, entitled "Digital Security Bubble," filed on Jan. 8, 2015 and issued as U.S. Pat. No. 9,584,316 on Feb. 28, 2017, which is a continuation of U.S. patent application Ser. No. 14/089,634, entitled "Digital Security Bubble," filed on Nov. 25, 2013 and issued as U.S. Pat. No. 8,954,726 on Feb. 10, 2015, which is a continuation of U.S. patent application Ser. No. 13/942,554 entitled "Digital Security Bubble," filed Jul. 15, 2013 and issued as U.S. Pat. No. 8,625,805 on Jan. 7, 2014, which claims priority to U.S. Provisional Patent Application No. 61/672,099 entitled "Digital Security Bubble Is A Cross Platform Algorithm That Secures Communications Originating From A Mobile Device, Computer, Web, Or Any Other Device Connected Via Either A Cellular Network, Wifi, Bluetooth, Or Optical Connection With Other Devices. Communications Could Be Text, Video, Audio, Pictures, And Any Type Of Files That Could Be Sent As Attachments" filed Jul. 16, 2012, all of which are incorporated herein by reference for all purposes.

This application is also related to U.S. patent application Ser. No. 15/900,897, entitled "Digital Security Bubble," filed on Feb. 21, 2018, and U.S. patent application Ser. No. 14/791,198, entitled "Initialization and Registration of an Application," filed on Jul. 2, 2015, which issued as U.S. Pat. No. 9,729,315 on Aug. 8, 2017, the entireties of which are incorporated herein by reference.

BACKGROUND OF THE INVENTION

Users of electronic devices increasingly desire to communicate privately and securely with one another. Unfortunately, existing approaches to securing communications can be difficult and/or cumbersome to use. As one example, some approaches to data security make use of digital certificates or keys, or pre-shared passwords, which can be tedious to manage. Further, existing approaches are often susceptible to interception (e.g., eavesdropping and man-in-the middle attacks), forensic analysis, and impersonation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
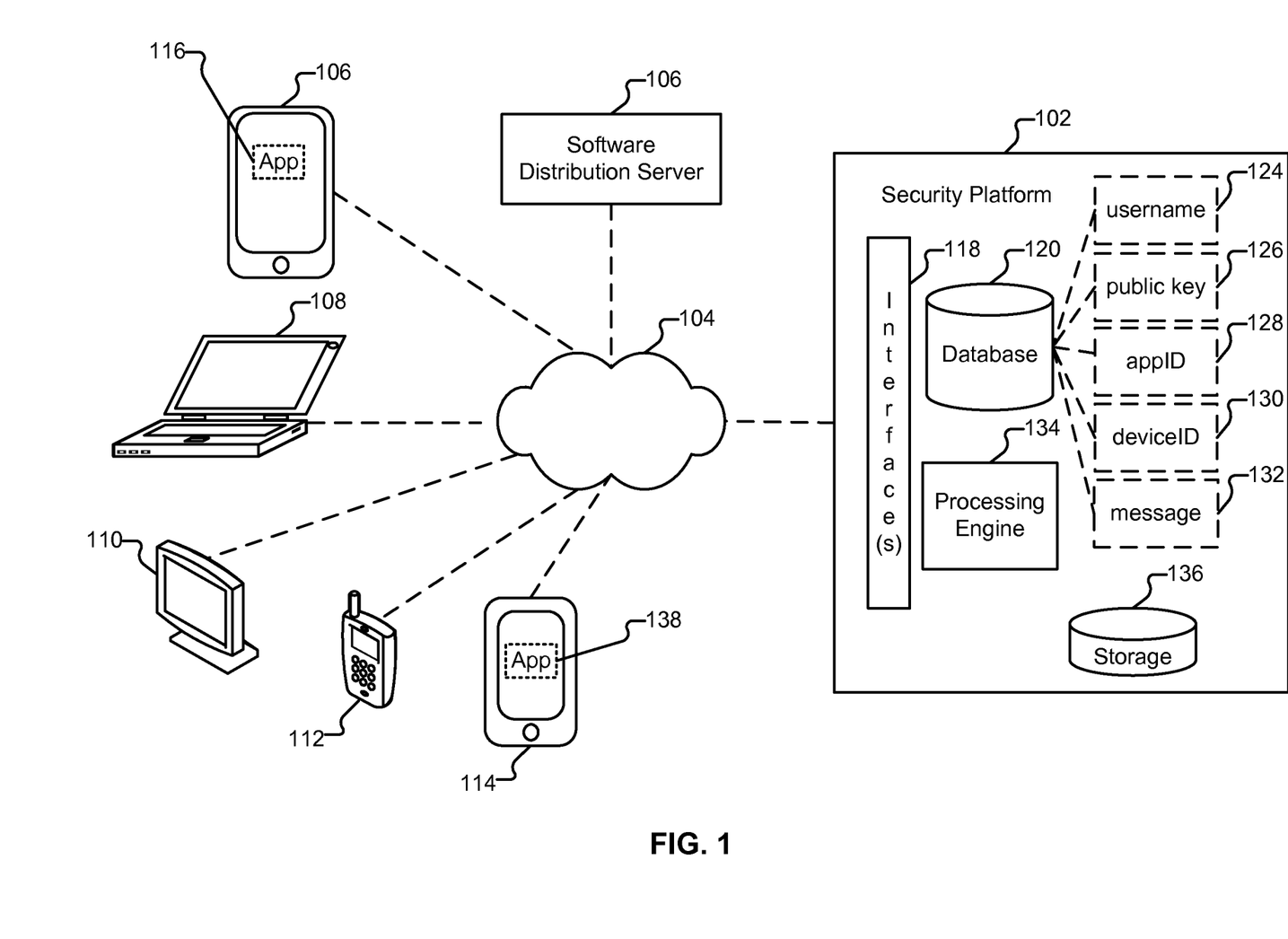
FIG. 1 illustrates an embodiment of an environment in which the exchange of secure communications is facilitated by a security platform.

FIG. 1 illustrates an embodiment of an environment in which the exchange of secure communications is facilitated by a security platform (e.g., security platform 102). In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform is unable to decrypt messages.

Users of client devices, such as client devices 106-114 communicate securely with one another using techniques described herein. As shown in FIG. 1, client devices include personal computers (110), laptop computers (108), tablets (106), and mobile telephony devices (112, 114). Some client devices, e.g., tablet device 106, make use of techniques described herein via a messaging application (also referred to as an "app") obtained from a software distribution server 106. Examples of software distribution servers (which can comprise a single server or multiple servers working in cooperation) include app stores (e.g., provided by Apple, Google, Blackberry, Microsoft, and Blackberry) and other webservers offering app downloads. Client devices can also make use of a web interface (e.g., provided by platform 102) instead of or in addition to a dedicated messaging application. Other types of devices not depicted in FIG. 1 can also be used in conjunction with the techniques describe herein, such as game consoles, video players (e.g., incorporating DVD, Blu-ray, Red Laser, Optical, and/or streaming technologies) and other network-connected appliances, as applicable.

Communications are exchanged via one or more networks (depicted collectively in FIG. 1 as network cloud 104). Such networks can include wired, wireless, cellular, and satellite networks. And, such networks can be closed/private networks, as well open networks (e.g., the Internet). Further, as used herein, "communications" and "messages" can take a variety of forms, including: text messages, documents, audiovisual files, SMSes, voice and video calls. Further, the content can pertain to electronic transactions such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. As will be described in more detail below, the exchange of communications is facilitated by security platform 102.

A. Installation/Initialization/Registration

Suppose a user of client device 106 (hereinafter referred to as "Alice") would like to send a secure message to her friend, Bob (a user of client device 114) in accordance with techniques described herein. In some embodiments, in order to send a message Bob, Alice first obtains a copy of a messaging application suitable for her device. For example, if Alice's tablet device runs iOS, she could obtain an "app" for her tablet from the Apple App Store (an example of software distribution server 106). Bob similarly obtains an appropriate application suitable for his client device 114 (e.g., an Android-based smartphone) from an appropriate location (e.g., the Google Play store). In some embodiments, client devices make use of a web-based application (e.g., made available by platform 102 through interface 118), instead of, or in addition to, a dedicated installed application.

Figure 2:
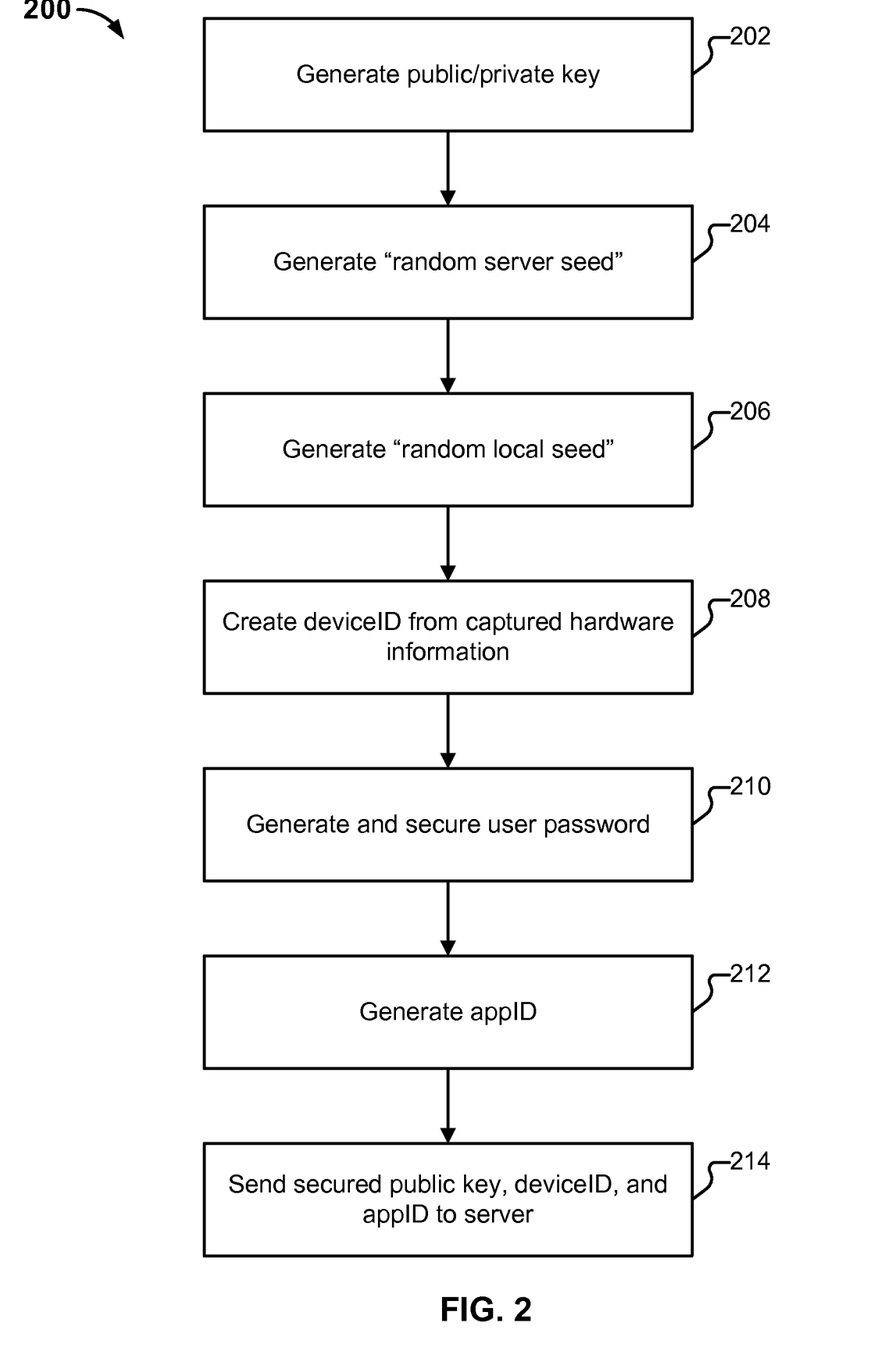
FIG. 2 illustrates an embodiment of an installation and registration process.

Once Alice's tablet 106 has obtained a copy of the messaging app, the app is installed, and Alice is able to register for an account. An instance of a messaging app usable in conjunction with the techniques described herein is depicted in FIG. 1 as app 116 (installed on device 106). Examples of events that can occur during an installation/initialization/registration process (200) are illustrated in FIG. 2 and will now be described.

In some embodiments, process 200 is performed on a client device, such as Alice's client device 106. The process begins at 202 when a public/private keypair for the application is generated, on client device 106 (e.g., using RSA, ECDH, or any other asymmetric encryption algorithms). As one example, the keypair can be generated using Eliptic Curve Algorithm with Diffie Helman Key Exchange (ECDH). Other cryptographic standards can also be used, such as RSA. At 204, a "random server seed" is generated, and at 206, a "random local seed" is generated. The seeds are used in conjunction with cryptographic key generation, and in some embodiments, the seeds are determined based on captured hardware information (described in more detail below).

At 208, a device identifier ("deviceID") is created from captured hardware information. Examples of captured hardware information include: hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

At 210, Alice is asked, via an interface provided by app 116, to supply a desired username. Alice enters "Alice" into the interface. A determination is made as to whether the username is available. As one example, app 116 can supply a cryptographic hash of "Alice" to platform 102 for checking. If platform 102 does not already have a record for that hash, the username "Alice" is available for Alice to use. If platform 102 already has a record of that hash, Alice is instructed by the interface to pick an alternate username. Once Alice has selected an available username, she is asked to supply a password.

At 212, an application identifier ("appID") is created. The appID is a unique identifier for the particular installation of the messaging app. If Alice installs the messaging app on multiple devices, each of her devices will have its own unique appID. (And, each of her devices will also have its own unique deviceID.) In some embodiments, the appID is created by hashing Alice's selected password and other information such as device information.

Finally, at 214 Alice's public key, deviceID, and appID are sent to platform 102 in a secure manner. As one example, in some embodiments app 116 is configured to communicate with platform 102 via TLS. At the conclusion of process 200, Alice is ready to send and receive secure communications, described in Sections C and E below, respectively.

B. Security Platform

As mentioned above, security platform 102 is configured to facilitate the exchange of communications (e.g., among any/all of client devices 106-114). Additional detail regarding various aspects of platform 102 will now be provided.

Security platform 102 includes one or more interface(s) 118 for communicating with client devices, such as client devices 106-114. As one example, platform 102 provides an application programming interface (API) configured to communicate with apps installed on client devices, such as app 116 and app 138. Platform 102 can also provide other types of interfaces, such as a web interface, or stand-alone software programs for desktops and laptops, running on various Operating Systems (OS). The web interface can allow users of client devices such as client devices 108 and 110 to exchange messages securely (whether with one another or other users), without the need for a separately installed messaging application. The stand-alone software program allows users to exchange secure messages via software that is downloaded by each user.

Security platform also includes a database 120. Included in database 120 is a record for each user of platform 102. Each record has associated with it information such as the user's public key, deviceID(s), appID(s), and messages. As shown in FIG. 1, database 120 is relational and stores information in a variety of tables, including a table of hashed usernames (124), a table of public keys (126), a table of deviceIDs (128), a table of appIDs (130), and a table of messages (132). Other techniques can also be used to store the information used by platform 102. For example, messages can be stored in a separate storage 136 instead of being stored within database 120.

Finally, security platform 102 includes a processing engine 134 which performs a variety of tasks, including interacting with database 120 on behalf of interface(s) 118. The embodiment of platform 102 depicted in FIG. 1 comprises standard commercially available server hardware (e.g., having a multi-core processor(s), 8G+ of RAM, gigabit network interface adaptor(s), and hard drive(s)) running a typical server-class operating system (e.g., Linux). In various embodiments, platform 102 is implemented across a scalable infrastructure comprising multiple such servers, solid state drives, and/or other applicable high-performance hardware.

Whenever platform 102 is described as performing a task, either a single component or a subset of components or all components of platform 102 may cooperate to perform the task. Similarly, whenever a component of platform 102 is described as performing a task, a subcomponent may perform the task and/or the component may perform the task in conjunction with other components.

C. Sending DSB Secured Messages

Returning back to Alice's desire to send a message to Bob: at the conclusion of Section A above, Alice has successfully registered her username ("Alice") with security platform 102. And, Bob is also a user of platform 102. Suppose Alice would like to send a message to Bob. She loads app 116 and is presented with an interface that includes a "compose" option. Alice selects the compose option and is presented with a message composition interface.

Figure 3:
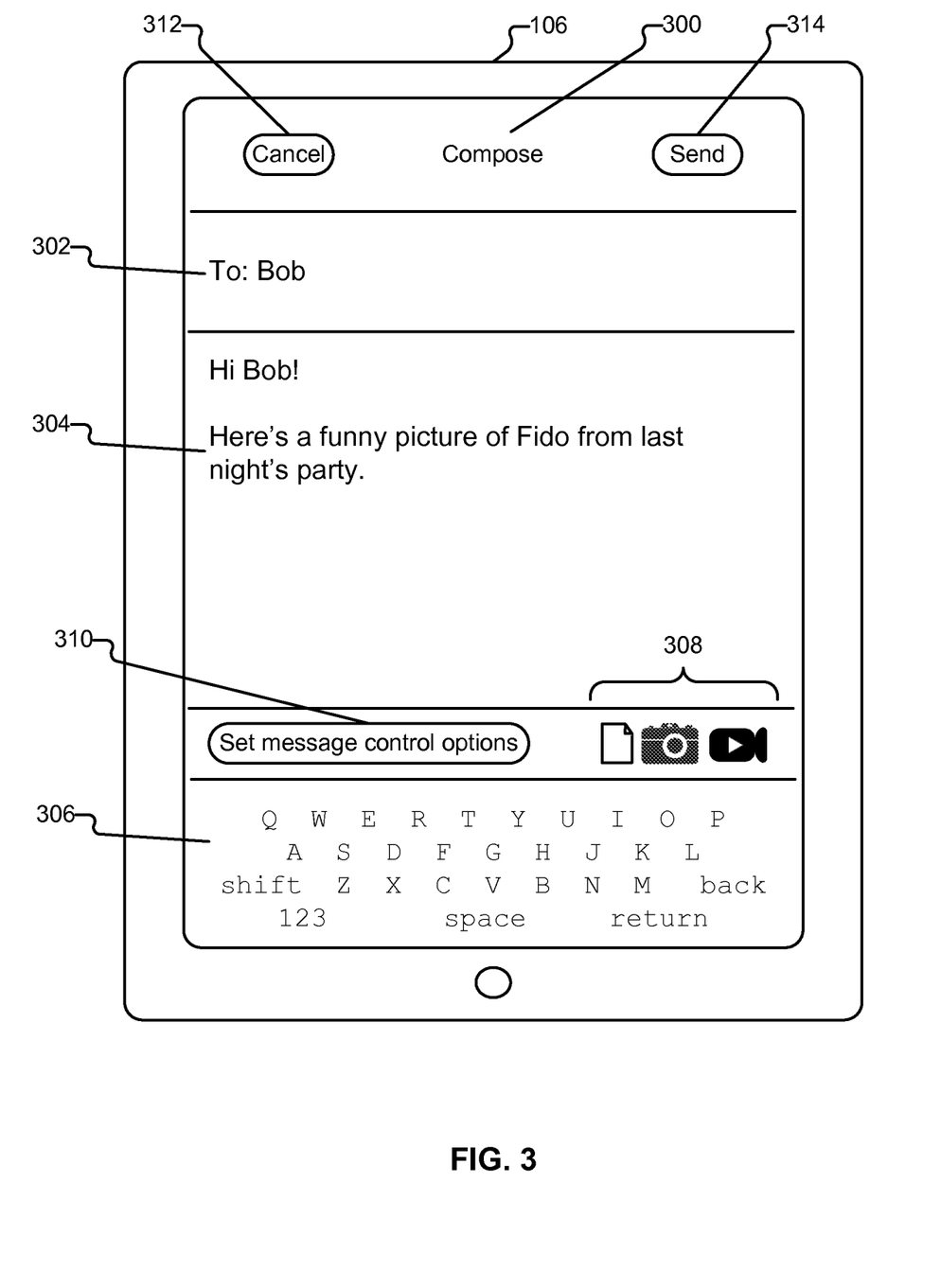
FIG. 3 illustrates an example of an interface.

An example message composition interface is shown in FIG. 3. In particular, FIG. 3 depicts interface 300 as rendered on an example tablet device 106, connected to the Internet via an appropriate connection, such as: 3G, 4G or higher cellular connection, WiFi, Satellite, wireless or wired LANs, Bluetooth, etc. Tablet device 106 includes a touchscreen. An on-screen keyboard is provided for Alice in region 306. Alice can enter the usernames of one or more recipients in region 302. She can enter message text in region 304. Alice can optionally add attachments by interacting with buttons shown in region 308. Examples of attachments include, but are not limited to: documents, pictures, and audiovisual clips. By selecting button 310, Alice can specify various message control options, such as: the lifetime/expiration of the message; on which device(s) it can be unencrypted/read; and sharing, saving, forwarding, recalling, and deleting options.

If Alice is satisfied with her message, she can send it to Bob by clicking the send button (314). If she wishes to cancel out of composing the message, she can click the cancel button (312). Suppose Alice clicks send button (314) after composing the message shown in interface 300. An example of the events that occur, in some embodiments, in conjunction with Alice sending a message is illustrated as process 400 in FIG. 4 and will now be described.

Figure 4:
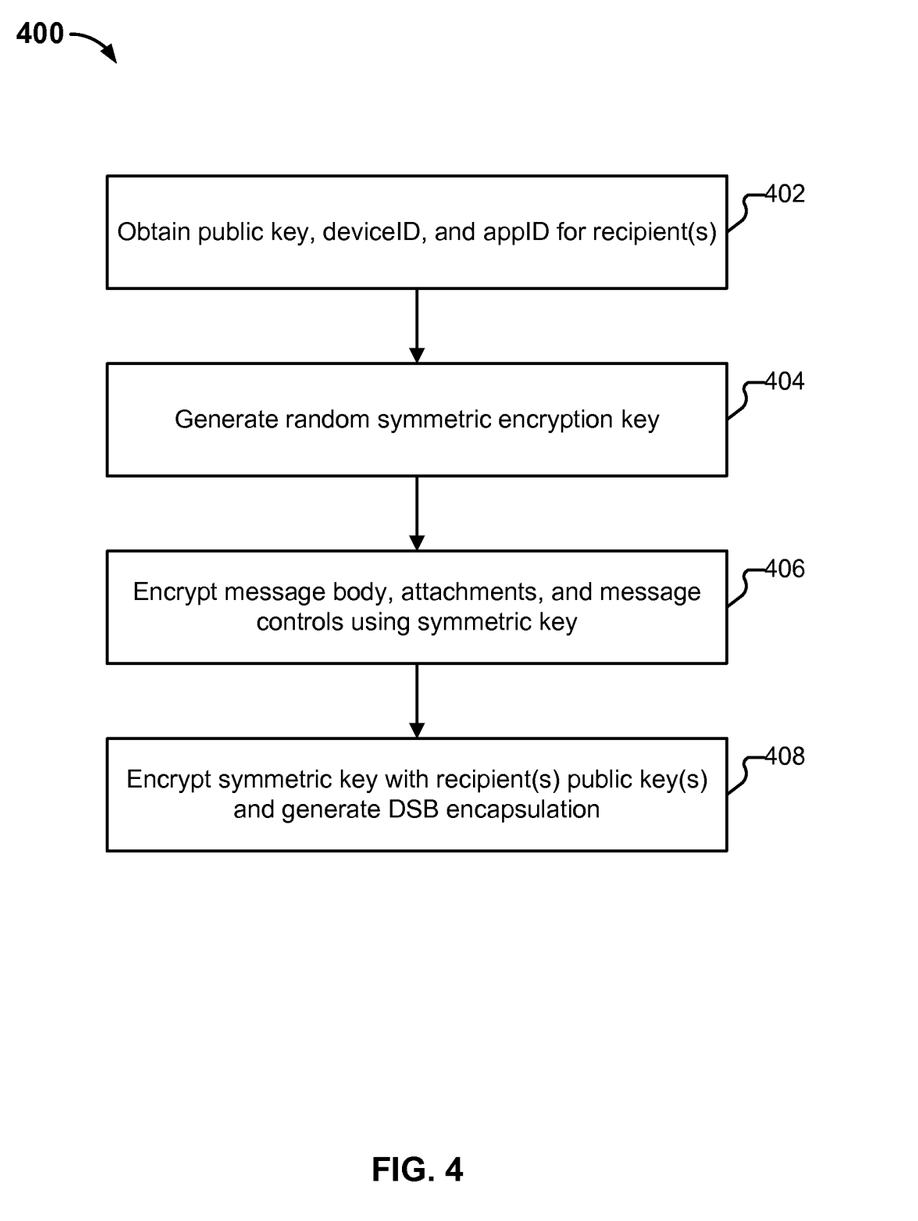
FIG. 4 illustrates an example of a message sending process.

FIG. 4 illustrates an example of a process for sending a DSB-secured message. In some embodiments, process 400 is performed on a client device, such as Alice's client device 106. The process begins at 402 when the public key, deviceID, and appID of a recipient are obtained from platform 102. As will be explained in more detail below, the recipient's public key, deviceID and appID are used in the encryption of the symmetric key used to encrypt data, and in the DSB encapsulation of the message for the hardware/appID binding of the message. As one example, app 116 can request the information from platform 102 via an API (e.g., interface 118). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also desires to send the message to other recipients, she can enter their names in region 302 as well, and their respective public keys, deviceIDs, and appIDs will also be retrieved at 402.

At 404, a random symmetric encryption key is generated (e.g., by app 116 on device 106). As one example, the symmetric key is an AES 256 bit key. At 406, the symmetric encryption key is used to encrypt the message body, any attachments, and any message control options. In some embodiments, Alice's own information (e.g., her public key, deviceID(s), and appID(s) are included in the DSB as well. Finally, at 408, the symmetric key is encrypted with the public key of each recipient. A DSB encapsulation is then generated, and contains the aforementioned components. Examples of the DSB format are provided in Section D below.

In some cases, a user may own multiple devices. For example, Bob may be the owner of device 114 and 112, both of which are configured with secure messaging apps. Each of Bob's installations will have its own deviceID and appID. When the DSB is created, each of Bob's devices will be considered a separate device under the same username account.

The generated DSB is securely transmitted to platform 102 (e.g., by being encrypted with a symmetric key shared by the app and platform 102, and also encapsulated by TLS as an additional security layer). Irrespective of how many recipients Alice designates for her message (and, e.g., how many recipients there are or how many devices Bob has), only one DSB will be created and transmitted to platform 102. Upon receipt of the DSB, processing engine 134 opens the DSB and determines the recipients of the message. Specifically, the processing engine 134 performs a match against the deviceIDs (in a cryptographic hash and camouflaged representation) included in the DSB and the deviceIDs stored in database 120 as well as the username (in a cryptographic hash and camouflaged representation) in the DSB and the ones stored in the database 120. A cryptographic hash and camouflaged representation means that the hash algorithm (i.e. SHA256) that is used for the deviceID, username, and appID values, is further camouflaged, in some embodiments, by taking multiple hashes of the result values (i.e. multiple rounds of SHA256 of the previous SHA256 value—i.e. SHA(SHA(SHA(SHA . . . ))). Processing engine 134 also creates an entry for the received DSB in message table 132 and notifies the recipient(s) that a new message is available. In various embodiments, other actions are also performed by platform 102 with respect to the DSB. As one example, platform 102 can be configured to remove the DSB as soon as the recipient successfully downloads it. As another example, platform 102 can enforce an expiration time (e.g., seven days) by which, if the DSB has not been accessed by the recipient, the DSB is deleted. Where multiple recipients are included in a DSB, platform 102 can be configured to keep track of which recipients have downloaded a copy of the DSB, and remove it once all recipients have successfully downloaded it (or an expiration event has occurred).

D. DSB Examples

Figure 5:
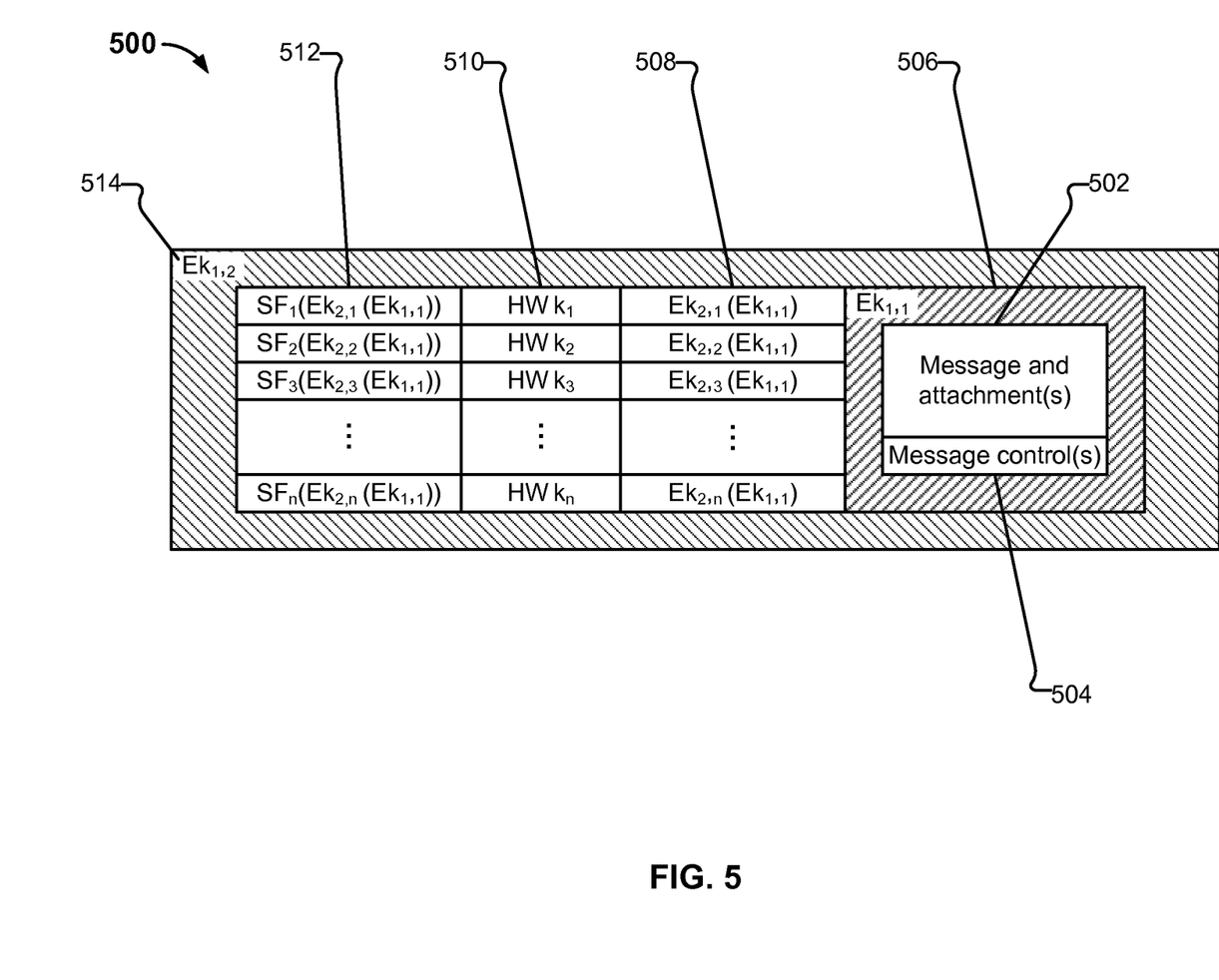
FIG. 5 illustrates an example of a digital security bubble.

FIG. 5 illustrates an example of a digital security bubble (DSB). DSB 500 is an example of output that can be generated by app 116 as a result of executing process 400. In the example shown, DSB 500 includes a message and optional attachments (502), and one or more message controls (504) encrypted with a key $Ek_{1,1}$ (encrypted portion 506). In some embodiments, key $Ek_{1,1}$ is generated by app 116 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-n, the key $Ek_{1,1}$ encrypted by each of the recipient's respective public keys (as shown in region 508). Further, DSB 500 includes a combination of each recipient's respective deviceID, hashed username, and appID (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 102.

In some embodiments (e.g., as is shown in FIG. 5), a spreading function is used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each of them. Finally, the DSB is itself encrypted using key $Ek_{1,2}$ (encrypted portion 514), which is a symmetric key shared between app 116 and platform 102. Additional detail regarding portions 514 and 508 are shown in FIG. 8, where SK1 in FIG. 8 is $Ek_{1,2}$ in FIG. 5 and represents the symmetric encryption key shared by the app and platform 102, and where $User_1$Pubkey in FIG. 8 is $Ek_{2,1}$ in FIG. 5 and represents the recipient's public key (e.g., generated at 202).

Figure 6:
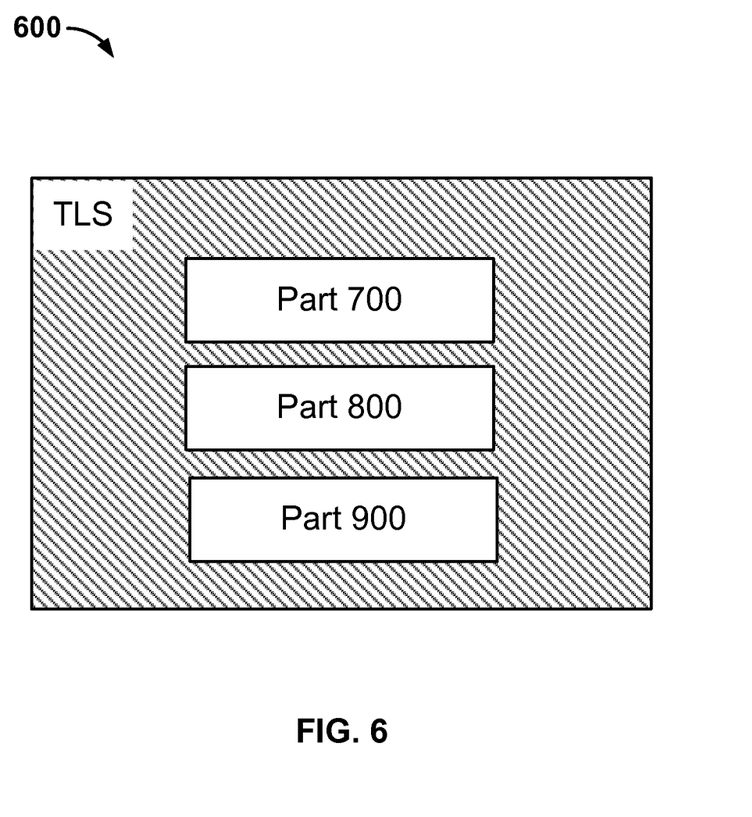
FIG. 6 illustrates an example of a digital security bubble.
Figure 7:
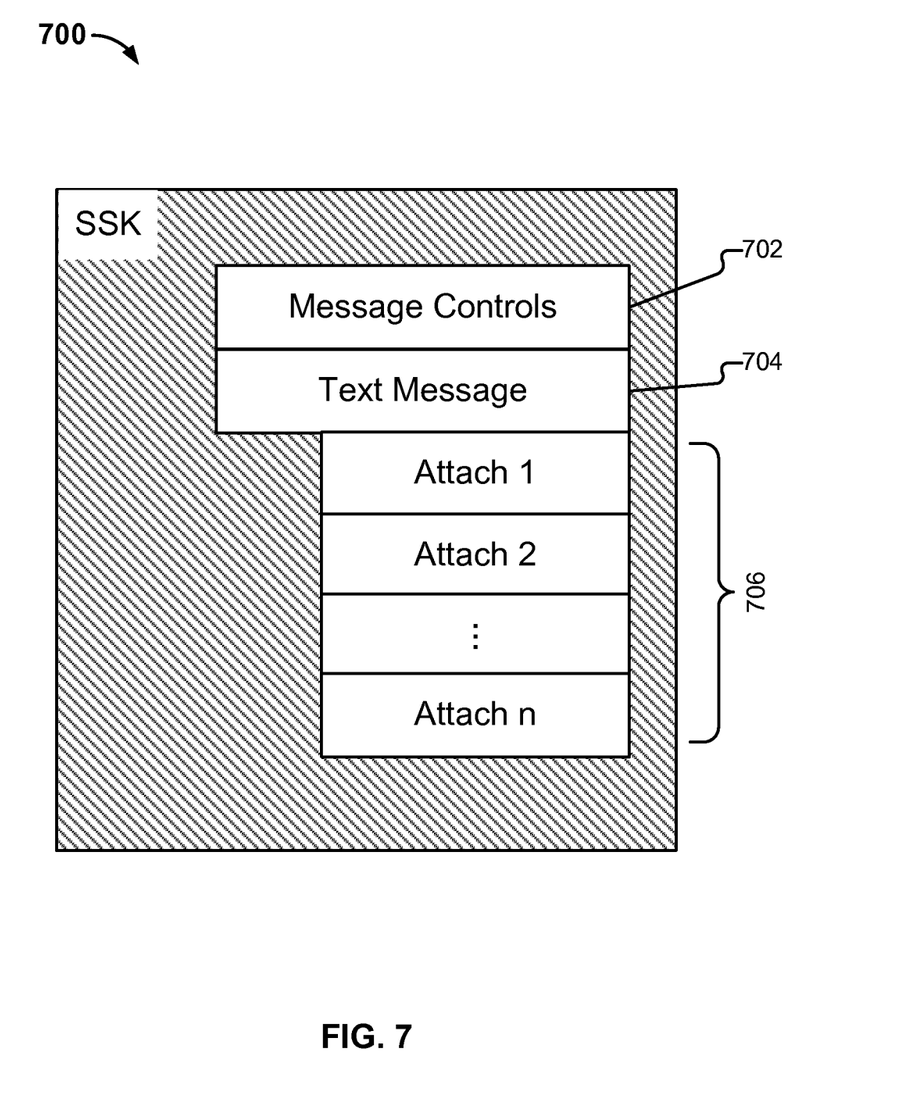
FIG. 7 illustrates an example of a portion of a digital security bubble.
Figure 8:
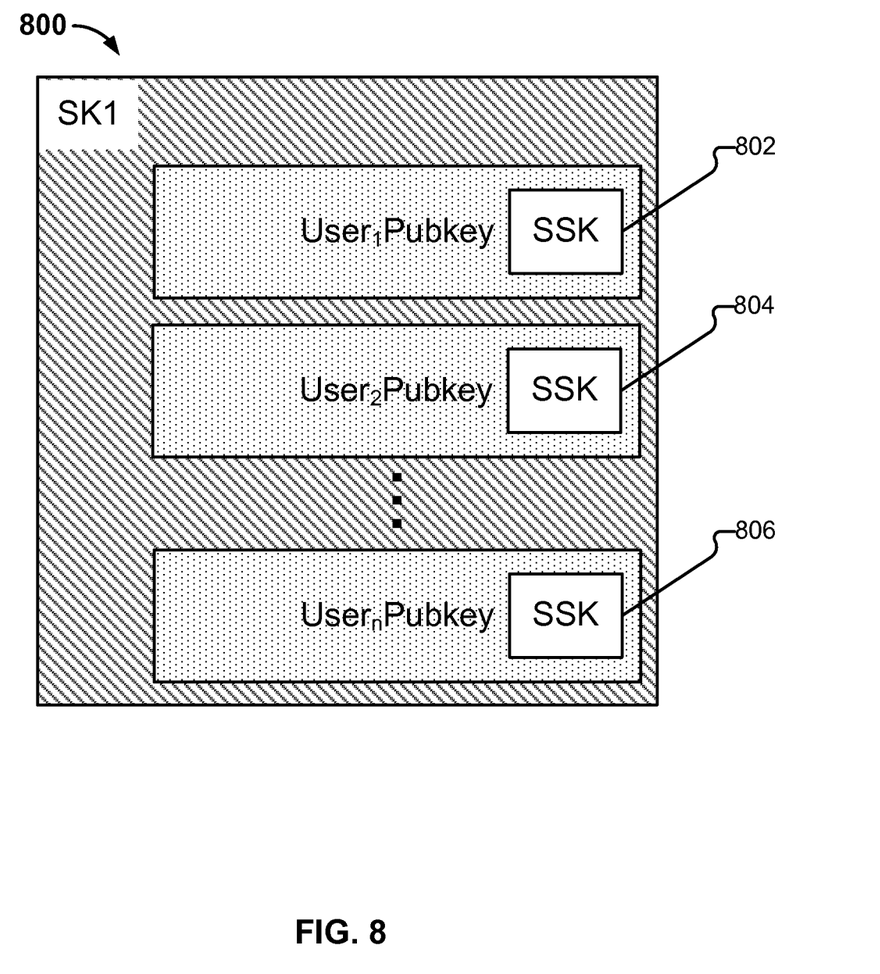
FIG. 8 illustrates an example of a portion of a digital security bubble.
Figure 9:
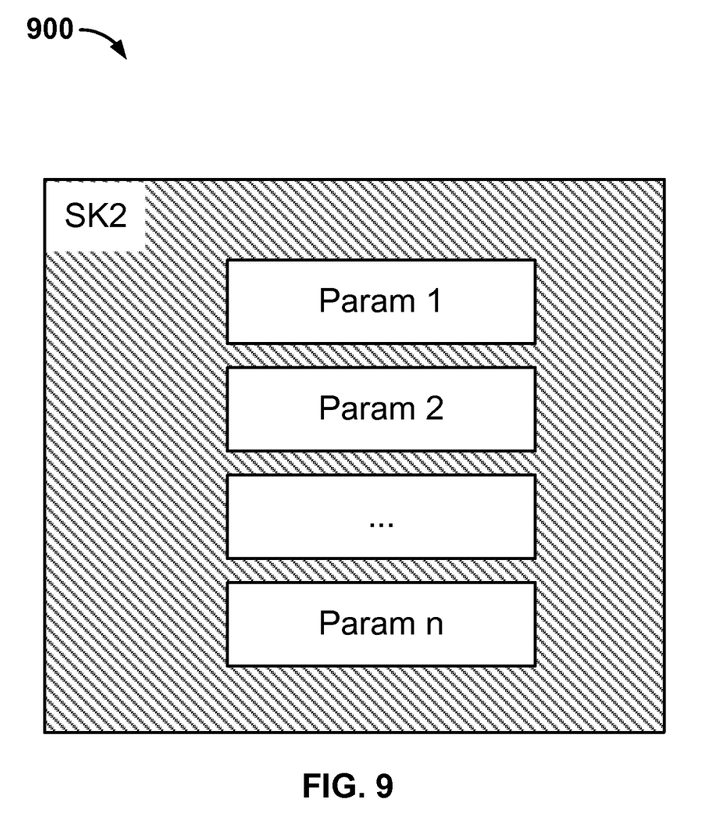
FIG. 9 illustrates an example of a portion of a digital security bubble.

FIGS. 6-9 illustrate additional examples of the construction of an embodiment of a DSB. FIG. 6 illustrates an example of a DSB 600. DSB 600 encapsulates three subcomponents—part 700 (the encrypted message, attachments, and controls), part 800 (the symmetric key encrypted with each recipient's public key), and part 900 (encrypted message parameters). As with DSB 500, a symmetric key (shared by app 116 and platform 102) is used to secure the DSB. In addition, the transmission of the DSB to the server is encapsulated with TLS for an additional security layer. FIG. 7 illustrates part 700 of DSB 600. In particular, part 700 includes the message controls (702), message (704), and attachments (706). Part 700 is encrypted using a shared symmetric key SSK (e.g., $Ek_{1,1}$). FIG. 8 illustrates part 800 of DSB 600. In particular, part 800 includes the shared symmetric key, encrypted to each of the recipients' respective public keys. Further, the collection of encrypted keys (802-806) is encrypted using symmetric key SK1. FIG. 9 illustrates part 900 of DSB 600. In particular, part 900 includes encrypted message parameters. Part 900 is encrypted using symmetric key SK2.

E. Receiving DSB Secured Messages

As mentioned above, Bob is also a user of platform 102. When Bob loads his copy of the messaging app on his smartphone (i.e., app 138 on device 114), the app communicates with platform 102 (e.g., via interface 118) to determine whether Bob has any new messages. Since Alice has sent a message to Bob since he last used app 138, a flag is set in database 120, indicating to app 138 that one or messages are available for download.

Figure 10:
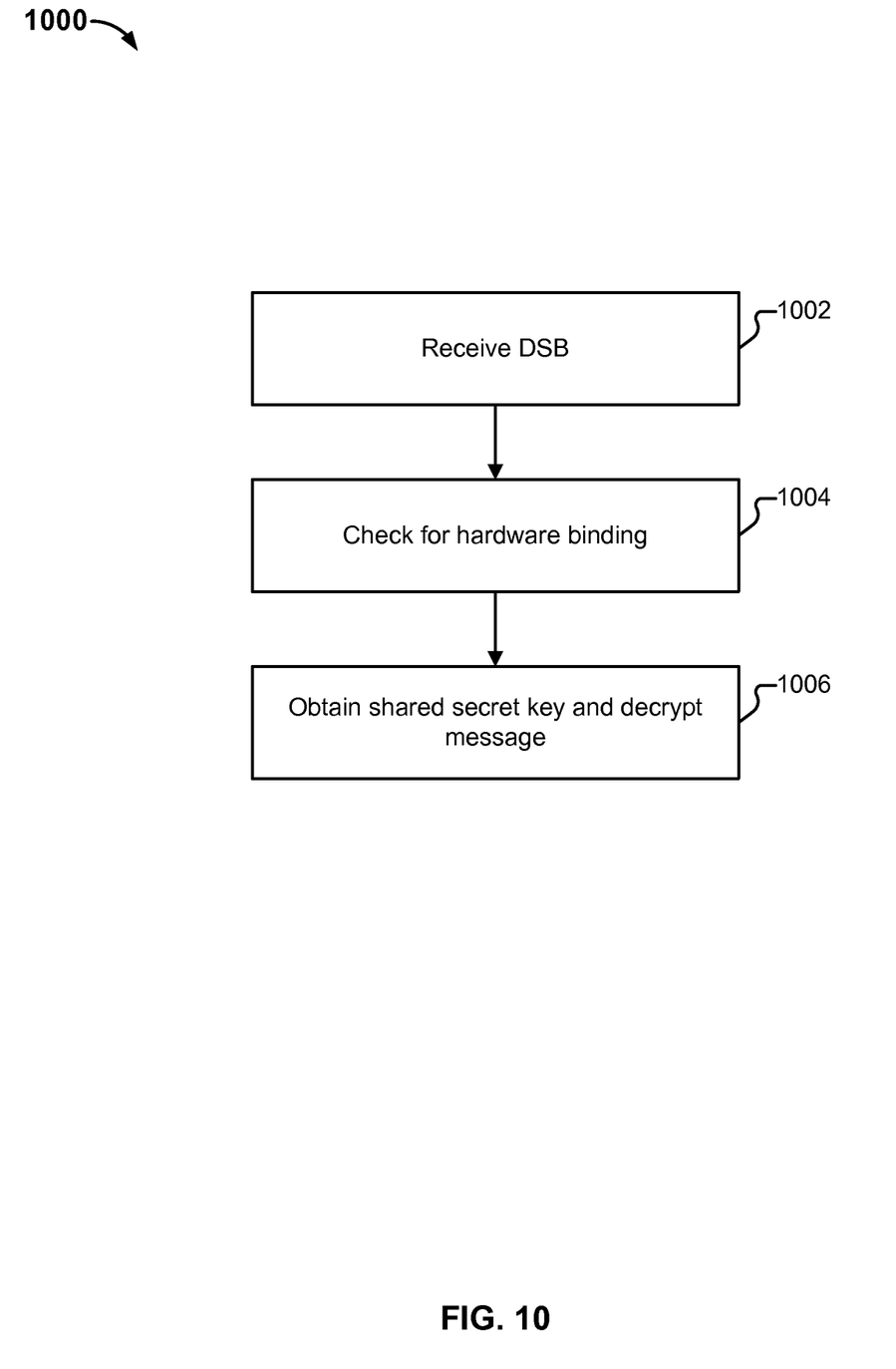
FIG. 10 illustrates an example of a process for accessing a message included inside a digital security bubble.

FIG. 10 illustrates an example of a process for accessing a message included inside a digital security bubble. In some embodiments, process 1000 is performed on a client device, such as Bob's client device 114. The process begins at 1002 when a DSB is received. As one example, a DSB is received at 1002 when app 138 contacts platform 102, determines a flag associated with Bob's account has been set, and downloads the DSB from platform 102. In such circumstances, upon receipt of the DSB, client 114 is configured to decrypt the DSB using Bob's private key (e.g., generated by Bob at 202 in process 200).

At 1004 (i.e., assuming the decryption was successful), hardware binding parameters are checked. As one example, a determination is made as to whether device information (i.e., collected from device 114) can be used to construct an identical hash to the one included in the received DSB. If the hardware binding parameters fail the check (i.e., an attempt is being made to access Alice's message using Bob's keys on a device that is not Bob's), contents of the DSB will be inaccessible, preventing the decryption of Alice's message. If the hardware binding parameter check is successful, the device is authorized to decrypt the symmetric key (i.e., using Bob's private key generated at 202) which can in turn be used to decrypt Alice's message.

F. Discouraging Screen Capture

As explained above, in addition to text messages (e.g., shown in region 304 of FIG. 3), users can compose messages that include a variety of multi-media attachments (e.g., by interacting with region 308 of FIG. 3). Returning to the example of FIG. 3, suppose Alice attached a picture of her dog, Fido, to the message prior to sending to Bob. As explained above, and as illustrated in FIGS. 5 and 7, attachments to her message (i.e., the dog photograph) will also be encrypted, and can only be decrypted by intended recipients.

Some devices, such as tablet device 106 and phone 114 provide native support for users of those devices to capture their screens. As one example, a user of an iOS device can capture what is being displayed on the device by holding down the menu button and, while the button is being held, also pressing the power/lock button. Alice may wish for Bob to be able to view her dog photograph for a limited time, and then have it no longer available to him. Unfortunately, if Bob uses the built-in screen capture feature of his phone while viewing Alice's picture, he'll be able to save a copy for later viewing.

Figure 11:
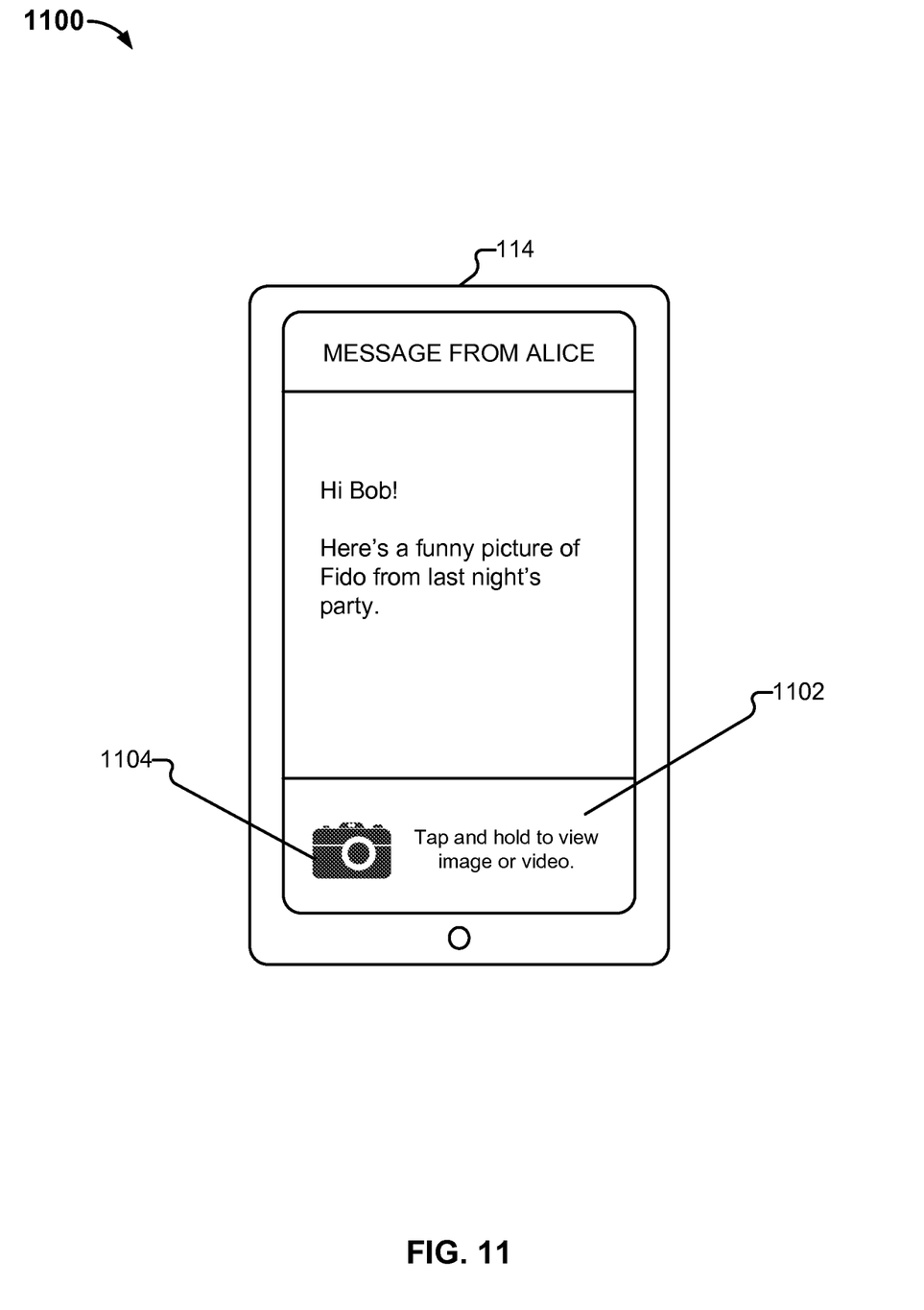
FIG. 11 illustrates an example of an interface.
Figure 12:
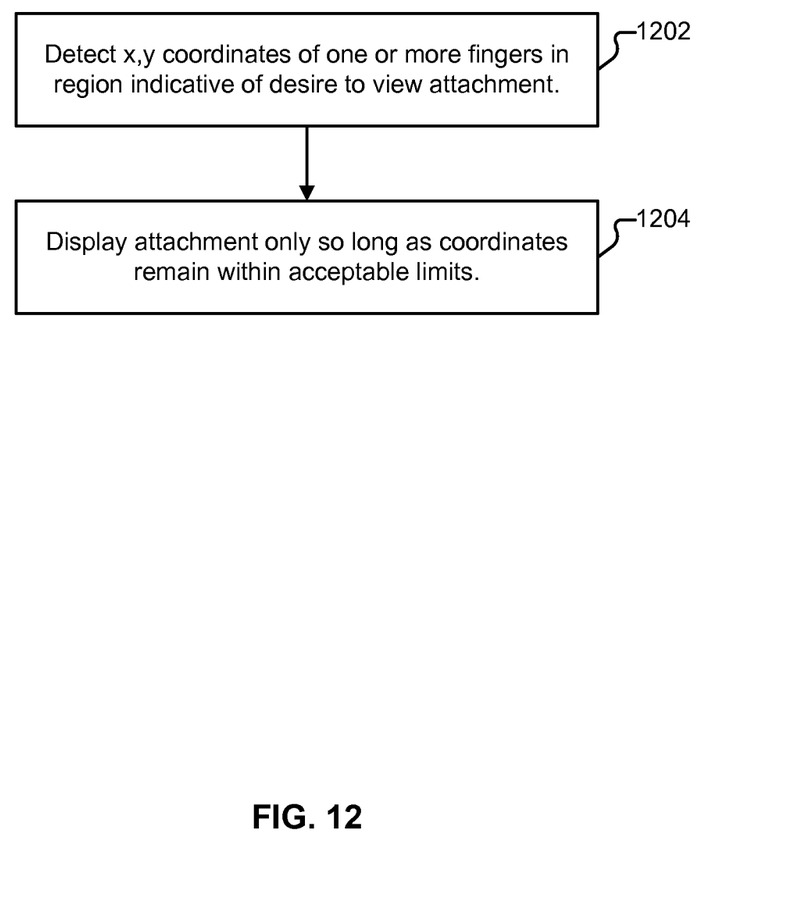
FIG. 12 illustrates an example of a process for mitigating screen capture attempts.

In some embodiments, messaging app 138 is configured to help mitigate screen capture attempts by users. An example of the process is shown in FIG. 12. In some embodiments, process 1200 is performed on a client device, such as Bob's client device 114. The process begins at 1202 when x,y coordinates of one or more fingers are detected in an appropriate region. As one example, portion 1104 of interface 1100 includes a message to Bob, asking him to place his finger on icon 1104 in order to view Alice's dog picture. When Bob does so, the x,y coordinates of his finger will be detected (at 1202).

The x,y coordinates are checked every time they change (for example, when the finger touching the icon moves). If the move is more than a few pixels (e.g., more than 10 pixels), this can be indicative of a user attempting to manipulate the device and take a screen shot while also holding down icon 1104. The attachment preview will accordingly end (at 1204) if the change in finger position is too great, minimizing the possibility of a receiver taking unauthorized screen shots of attachments received in a secure message. Once an attachment preview has ended in this manner, in some embodiments, the user can view the attachment again (so long as it has not expired) by placing and holding a finger steady in region 1104.

In some embodiments, the number of pixels by which a finger may move without being considered an attempted screen capture is adjustable by the sender. For example, a sender can allow for more pixels (less sensitive) or fewer pixels (more sensitive) depending on the desired sensitivity. The number of pixels can also be determined by the application (e.g., based on the native resolution of the device, or other characteristics of the device, etc.).

In some embodiments, multiple screen areas or screen figures are required to be touched. This forces the user to hold more than one finger to tap and hold an area or areas, making it even more difficult to attempt to take a screen shot with the device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for transmitting an encrypted encapsulation, the method comprising:
    requesting, by a first device, an identifier associated with a first recipient from a first server;
    encrypting, by the first device, a communication using a first key;
    encrypting, by the first device, the first key using a second key associated with the first recipient, wherein the second key is obtained from the first server;
    encapsulating the encrypted communication, the encrypted first key, and the identifier in an encrypted encapsulation; and
    transmitting the encrypted encapsulation to the first recipient.

2. The method of claim 1, further comprising generating, by the first device, the first key.

3. The method of claim 1, wherein the identifier comprises a device identifier.

4. The method of claim 3, wherein the device identifier is based at least in part on at least one hardware identifier.

5. The method of claim 1 wherein the identifier comprises an application identifier.

6. The method of claim 1 wherein the second key is a public key associated with the first recipient.

7. The method of claim 1 further comprising:
    requesting, by the first device, a plurality of public keys and a plurality of identifiers associated with a plurality of recipients from the first server.

8. The method of claim 7 further comprising:
    encrypting, by the first device, the first key with each of the plurality of public keys to produce a plurality of encrypted first keys; and
    encapsulating, by the first device, the plurality of encrypted first keys in the encrypted encapsulation.

9. The method of claim 8, further comprising:
    transmitting, by the first device, the encrypted encapsulation with the plurality of encrypted first keys to the plurality of recipients.

10. A non-transitory computer-readable medium comprising instructions that, when executed by at least one processor, perform the steps of:
    requesting an identifier associated with a first recipient from a first server;
    encrypting a communication using a first key;
    encrypting the first key using a second key associated with the first recipient, wherein the second key is obtained from the first server;
    encapsulating the encrypted communication, the encrypted first key, and the identifier in an encrypted encapsulation; and
    transmitting the encrypted encapsulation to the first recipient.

11. A system for transmitting an encrypted encapsulation, the system comprising:
    a processor configured to:
        request an identifier associated with a first recipient from a first server;
        encrypt a communication using a first key;
        encrypt the first key using a second key associated with the first recipient, wherein the second key is obtained from the first server;
        encapsulate the encrypted communication, the encrypted first key, and the identifier in an encrypted encapsulation; and
        transmit the encrypted encapsulation to the first recipient; and
    a memory coupled to the processor and configured to provide the processor with instructions.

12. The system of claim 11, wherein the processor is further configured to generate the first key.

13. The system of claim 11, wherein the identifier comprises a device identifier.

14. The system of claim 13, wherein the device identifier is based at least in part on at least one hardware identifier.

15. The system of claim 11, wherein the identifier comprises an application identifier.

16. The system of claim 11, wherein the second key is a public key associated with the first recipient.

17. The system of claim 11, wherein the processor is configured to request a plurality of public keys and a plurality of identifiers associated with a plurality of recipients.

18. The system of claim 17, wherein the processor is further configured to:
    encrypt the first key with each of the received public keys to produce a plurality of encrypted first keys; and
    encapsulate the plurality of encrypted first keys in the encrypted encapsulation.

19. The system of claim 18, wherein the processor is configured to:
    transmit the encrypted encapsulation with the plurality of encrypted first keys to the plurality of recipients.

* * * * *